March 25, 1952  G. KAHN  2,590,709
SPRAY GUARD FOR KNIVES
Filed March 2, 1948
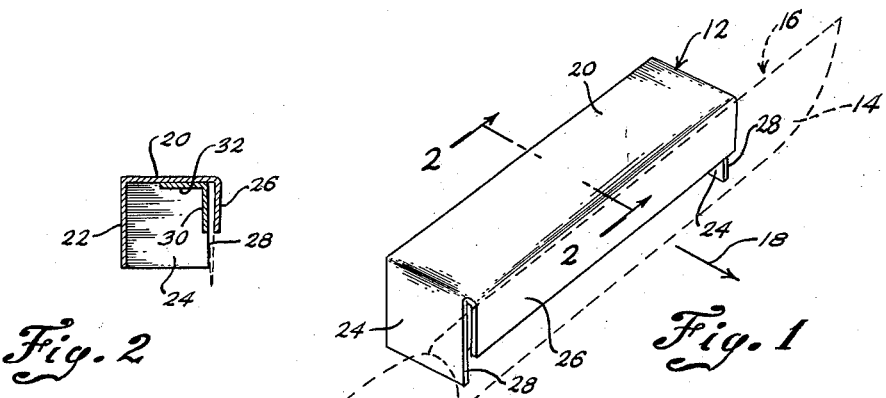
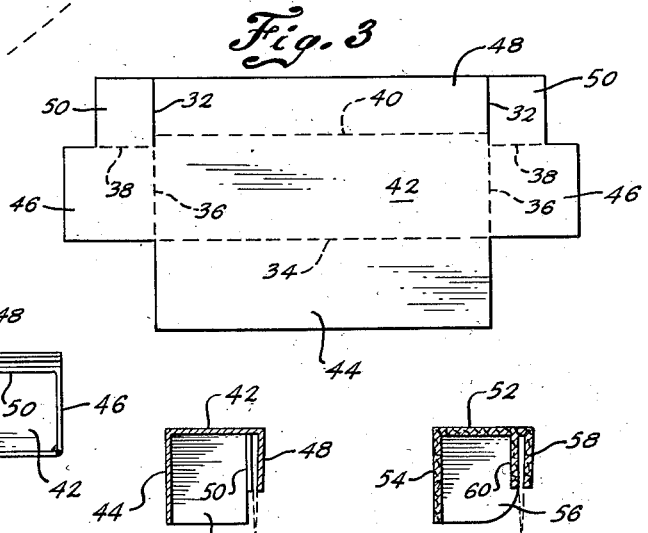
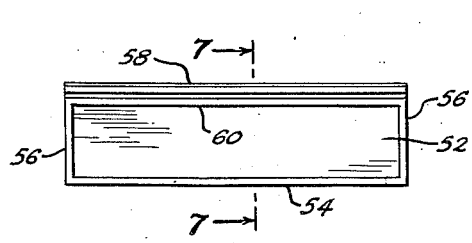
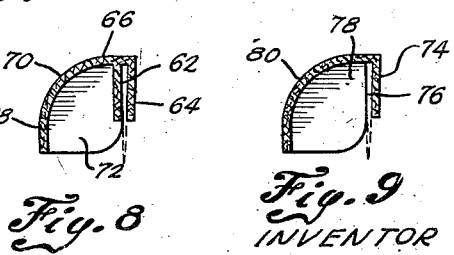
INVENTOR
GERTRUDE KAHN
BY James and Franklin
ATTORNEY Patented Mar. 25, 1952

2,590,709

UNITED STATES PATENT OFFICE 2,590,709

SPRAY GUARD FOR KNIVES

Gertrude Kahn, New York, N. Y.

Application March 2, 1948, Serial No. 12,557

3 Claims. (Cl. 30—286)

This invention relates to household utensils, especially kitchen knives, and more particularly to a spray guard for use when scraping vegetables or other food.

In scraping vegetables, for example, carrots, the carrot is ordinarily held in one hand and scraped by movement of a knife in a direction away from the body. Even when scraping in that direction there is a spattering of carrot juice back toward the person using the knife.

The general object of the present invention is to overcome the foregoing difficulty by the provision of a guard which is readily slipped over the back of an ordinary kitchen knife, and which serves to trap any juice sprayed backward from the knife when it is used as a scraper.

To accomplish the foregoing general object, and other more specific objects which will hereinafter appear, my invention resides in the spray guard elements, and their relation to a knife, as are more particularly described in the following specification. The specification is accompanied by a drawing in which Fig. 1 is a perspective view showing the guard applied to a knife;

Fig. 2 is a section taken approximately in the plane of line 2—2 of Fig. 1;

Fig. 3 shows a sheet metal blank for a modified form of the invention;

Fig. 4 is a bottom plan view of the modification made from the blank of Fig. 3;

Fig. 5 is a section taken approximately in the plane of line 5—5 of Fig. 4;

Fig. 6 is a bottom plan view of another modification of the invention;

Fig. 7 is a section taken approximately in the plane of line 7—7 of Fig. 6;

Fig. 8 is a similar section of a modification; and

Fig. 9 shows still another modification.

Referring to the drawing, and more particularly to Fig. 1, the spray guard 12 is applied to an ordinary kitchen knife 14, the guard being slipped over and frictionally held on the blunt back or upper edge 16 of the knife. To scrape a carrot or other food, the blade is preferably moved in the direction of the arrow 18, the guard 12 then being on the trailing side of the knife, and serving to trap any juice sprayed in rearward direction from the bottom edge of the knife.

Referring now to Figs. 1 and 2, the guard comprises a top wall 20, a back wall 22, end walls 24 and a gripper wall 26. The gripper wall 26 is spaced slightly from the front edges 28 of the end walls 24, the spacing being such as to receive the blunt back edge of the knife blade therebetween with a frictional grip. The gripper wall 26 may, if desired, be narrower than the back wall 22, and the back wall 22 is preferably narrower than the blade of the knife with which it is to be used. It will be seen from the drawing that the top wall 20, back wall 22, end walls 24 and gripper wall 26 may be, and preferably are, formed of a single piece of sheet metal. They form a boxlike structure which is open at the bottom, and which includes spaced means along one side to receive the knife blade.

If desired, the guard assembly may include a front wall, shown at 30 in Fig. 2. The front wall 30 extends collaterally of the gripper wall 26, and the spacing between the front wall and the gripper wall is such as to frictionally receive the knife blade therebetween. In the present case the front wall 30 is one side of an angle-shaped piece of sheet metal, the other side 32 of which is secured to the top wall 20 as, for example, by means of spot welding. The front wall 30 preferably has a width corresponding to the width of the gripper wall 26. It will be understood that the knife blade is held on one side by the gripper wall, and on the other side by either the forward edges 28 of the end walls 24, or by the front wall 30, or both. It will therefore be understood that when the front wall 30 is provided, the end walls 24 may be omitted, and conversely, when the end walls 24 are provided, the front wall 30 may be omitted. When the front wall is included, the spray shield has an inverted open ended channel to receive the knife blade.

In Figs. 3, 4 and 5 I illustrate a modification of the invention which is most respects is the same as that previously described, but which differs in forming the entire structure out of a single piece of sheet metal. A blank for this purpose is shown in Fig. 3, it being severed on the solid lines 32, and folded on the dotted lines 34, 36, 38 and 40. These lines define a top wall 42, back wall 44, end walls 46, gripper wall 48 and two partial front walls 50. The back wall 44 is formed by folding on line 34. The end walls 46 are formed by folding on lines 36. The front walls 50 are formed by bending them inwardly substantially perpendicularly to the end walls 46. The gripper wall 48 is formed by folding it on line 40. The gripper wall (in all forms of the invention) is preferably folded somewhat more than 90 degrees in order to improve the frictional grip on the knife blade.

The finished article is shown in Figs. 4 and 5, it comprising top wall 42, back wall 44, end walls 46, gripper wall 48, and partial front walls 50. It is evident that the knife blade will be seized frictionally between the front walls 50 and the gripper wall 48.

Reverting to Fig. 3, it will be evident that a blank for the modification shown in Figs. 1 and 2 would differ from that shown in Fig. 3 solely in the omission of the tabs or front wall portions 50, the lines 32 and 38 then forming a part of the outline of the blank.

Still another modification of the invention is shown in Figs. 6 and 7 of the drawing. In this modification the entire structure is formed out of an integral body of a moldable plastic material. Any one of the numerous moldable plastics may be employed but, of course, the selected plastic should be one which is relatively free from warping, particularly when subjected to hot water such as might be employed for washing or rinsing the guard after use. It should also be a plastic having some resilience, adequate to afford a frictional grip on the knife blade, and capable of yielding to receive knife blades which may differ somewhat from one another in thickness.

In the drawing it will be seen that the complete guard comprises a top wall 52, a back wall 54, end walls 56, a gripper wall 58 and a front wall 60. As before, the spacing between the gripper wall 58 and the front wall 60 is such as to receive a knife blade therebetween with a friction grip. Moreover, the walls 58 and 60 are preferably somewhat narrower than the back wall 54, and the latter in turn is preferably somewhat narrower than the knife blade with which the guard is intended to be used.

Fig. 8 is a section similar to Fig. 7 but shows a minor modification in which the top and rear walls curve into one another instead of being flat. The front wall 62 and gripper wall 64 correspond to those previously described. The top wall 66 and rear wall 68 merge on a curve 70, and the end walls 72 are, of course, appropriately modified to conform to the curve 70.

In connection with Figs. 1 and 2 it was mentioned that the front wall may be omitted if desired, and this is true also when the spray guard is made of plastic instead of metal. Fig. 9 shows a modification generally similar to that shown in Fig. 8, but in which the front wall 62 is omitted. The knife blade is gripped between the gripper wall 74 and the front edges 76 of the end walls 78. The continuous top and rear wall 80 corresponds to that shown in Fig. 8.

While not so illustrated in the drawing, it may be mentioned that the guard may, if desired, be tapered to better fit a tapered knife blade. Thus the spacing between the gripper wall and the front wall may be tapered from one end of the guard toward the other. As an independent matter, the width of the walls in vertical direction may be tapered from one end toward the other. However, in practice I think it simpler to employ a uniform rather than a tapered structure, not only for ease of manufacture, but also to make the guard applicable to either side of a knife, so that is may be used by either lefthanded or righthanded people.

It is believed that the construction and method of use, as well as the advantages of my improved spray guard, will be apparent from the foregoing detailed description. To use the guard it is merely necessary to slip the same over the blunt back edge of an ordinary kitchen knife, before scraping the vegetable or other food product in conventional fashion. The only precaution to be observed is to place the guard on the proper side of the knife blade, this differing according to whether the user is righthanded or lefthanded. The vegetable is scraped by moving the knife away from the body in the usual fashion, and any juice and fragments of skin sprayed rearwardly from the knife blade are trapped by the guard and drop harmlessly downward, instead of soiling or staining the clothes of the housewife.

It will be understood that the front wall is not essential if end walls are provided, and that the end walls are not essential if the front wall is provided, although I consider it preferable to use both. It will also be understood that the front wall may be partial, as shown in Fig. 4, as well as continuous, as shown in Fig. 2, and further that in the molded plastic form of the invention the front wall may, if desired, be partial instead of continuous, or, for that matter, may be omitted entirely.

It is not essential that the front wall and gripper wall be equal in width, nor that they be narrower than the rear wall, nor that the rear wall be narrower than the blade, for if the guard is used on a knife blade which is unusually narrow the guard may be left in a slightly raised position, instead of being pushed all the way downward on the blade. In other words, because of the frictional grip of the guard on the blade it is not essential that the top wall rest on the back edge of the knife. However, there is some advantage in properly proportioning the width of the guard, and in using it with a kitchen knife of normal dimension, in order that the downward location of the guard be determined positively, instead of by friction alone.

It will therefore be apparent that while I have shown and described the invention in several preferred forms, many changes may be made without departing from the spirit of the invention, as sought to be defined in the following claims.

In the claims the reference to the guard having a top wall and a rear wall is not intended to exclude the possibility of these walls merging or curving into one another, as shown in some figures of the drawing.

I claim:

1. A spray guard for a kitchen knife, said guard comprising a top wall, a back wall, end walls, and a gripper wall forming an extension of said top wall, said gripper wall being spaced slightly from the front edges of the end walls to receive the blunt back edge of a knife blade therebetween with a friction grip, with the guard slid downwardly over the top or back edge of the blade, said guard having a front wall extending collaterally of the gripper wall between the end walls and beneath the top wall, said top, back, end, front and gripper walls all being formed of a single integral body of a moldable plastic material.

2. A spray guard for a kitchen knife, said guard comprising a top wall, a back wall, a front wall, and a gripper wall forming an extension of said top wall, said gripper wall being spaced slightly from the front wall and forming an inverted open ended channel to receive the blunt back edge of a knife blade therebetween with a friction grip, with the guard slid downwardly over the top or back edge of the blade.

3. A spray guard as defined in claim 2 in which said top, back, front and gripper walls are all formed of a single integral body of a moldable plastic material, the spacing between the front and gripper walls being such as to frictionally grip the knife blade.

GERTRUDE KAHN.

REFERENCES CITED

The following references are of record in the file of this patent:

UNITED STATES PATENTS

| Number | Name | Date |
|---|---|---|
| 1,755,351 | Felardo | Apr. 22, 1930 |
| 2,103,329 | Karlson | Dec. 28, 1937 |
| 2,109,859 | Cope | Mar. 1, 1938 |